(12) United States Patent
Aichner et al.

(10) Patent No.: US 8,660,676 B2
(45) Date of Patent: Feb. 25, 2014

(54) MITIGATING THE IMPACT OF NONLINEAR ECHOS BY DYNAMIC RANGE COMPRESSION

(75) Inventors: Robert Andreas Aichner, Redmond, WA (US); Vinod Prakash, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 12/580,999

(22) Filed: Oct. 16, 2009

(65) Prior Publication Data

US 2011/0093102 A1 Apr. 21, 2011

(51) Int. Cl.
*G06F 17/00* (2006.01)

(52) U.S. Cl.
USPC .......................................................... 700/94

(58) Field of Classification Search
USPC .......................................................... 700/94
See application file for complete search history.

(56) References Cited

U.S. PATENT DOCUMENTS

| | | | | |
|---|---|---|---|---|
| 5,737,389 | A * | 4/1998 | Allen | 379/1.01 |
| 6,687,235 | B1 | 2/2004 | Chu | 370/286 |
| 7,027,592 | B1 | 4/2006 | Sträussnigg et al. | 379/406.8 |
| 7,333,447 | B2 | 2/2008 | LeBlanc | 370/286 |
| 2005/0207567 | A1* | 9/2005 | Parry et al. | 379/406.01 |
| 2007/0019803 | A1* | 1/2007 | Merks et al. | 379/406.08 |
| 2007/0280472 | A1 | 12/2007 | Stokes et al. | 379/406.01 |
| 2008/0165990 | A1* | 7/2008 | Kahan | 381/120 |
| 2009/0059821 | A1 | 3/2009 | Wu et al. | 370/286 |

OTHER PUBLICATIONS

Stenger, A., et al.; "*Nonlinear Acoustic Echo Cancellation with 2nd Order Adaptive Volterra Filters*"; IEEE Int. Conf. on Acoustics, Speech & Signal Processing (ICASSP); Mar. 1999; 4 Pgs.

Costa, J.-P., et al.; "*Acoustic Echo Cancellation Using Nonlinear Cascade Filters*"; IUP GMI, University of Avignon; 2003 IEEE; 4 Pgs.

Dai, H., et al.; "*Compensation of Loudspeaker Nonlinearity in Acoustic Echo Cancellation Using Raised-Cosine Function*"; IEEE Transactions on Circuits and Systems—II: Express Briefs, vol. 53, No. 11; Nov. 2006; 5 Pgs.

Kuech, F., et al.; "*Nonlinear Residual Echo Suppression Using a Power Filter Model of the Acoustic Echo Path*"; Fraunhofer Institute for Integrated Circuits/University of Erlangen-Nureumberg; 2007 IEEE; 4 Pgs.

Bendersky, D., et al.; "*Nonlinear Residual Acoustic Echo Suppression for High Levels of Harmonic Distortion*"; University of Buenos Aires/Microsoft Research; 2008 IEEE; 4 Pgs.

Kuech, F., et al.; "*Partitioned Block Frequency-Domain Adaptive Second-Order Volterra Filter*"; IEEE Transactions on Signal Processing, vol. 53, No. 2; Feb. 2005; 12 Pgs.

Nollett, B., et al.; "*Nonlinear Echo Cancellation for Hands-Free Speakerphones*"; Coordinated Science Laboratory, University of Illinois at Urbana-Champaign, Published Sep. 8, 1997; 5 Pgs.

(Continued)

*Primary Examiner* — Jesse Elbin
(74) *Attorney, Agent, or Firm* — Sonia Cooper; Jim Ross; Micky Minhas (57) ABSTRACT

Mitigation of nonlinear echoes by dynamic range compression may be provided. An audio output may be evaluated to determine whether nonlinear echoes are interfering with an audio signal. In order to reduce such nonlinear echoes, a dynamic range compression algorithm may be applied to the audio signal prior to output. The signal may be modified according to a compression wave and/or subjected to an attenuation factor.

20 Claims, 5 Drawing Sheets

(56) References Cited

OTHER PUBLICATIONS

Stenger, A., et al.; "*Nonlinear Acoustic Echo Cancellation with Fast Converging Memoryless Preprocessor*"; University of Erlangen-Nurnberg, Telecommunications Laboratory, Published Jun. 5, 2000; 4 Pgs.

Stenger, A., et al.; "*RLS-Adapted Polynomial for Nonlinear Acoustic Echo Cancelling*"; Telecommunications Laboratory, University of Erlangen-Nuremberg, Published Sep. 2000; 4 Pgs.

* cited by examiner

MITIGATING THE IMPACT OF NONLINEAR ECHOS BY DYNAMIC RANGE COMPRESSION

BACKGROUND

Dynamic range compression is a process for mitigating the impact of nonlinear echoes on acoustic echo cancellation. In some situations, an acoustic echo canceller is needed whenever the coupling between a loudspeaker and a microphone is not sufficiently low. Without attenuating the far-end signal, which is rendered by the loudspeaker at the near-end, the signal would be picked up by the microphone at the near-end and sent back to the far-end where it is perceived as an echo due to the latency of the transmission. In conventional systems, some attenuation of the echo can be achieved by a linear adaptive filter which tries to model the acoustic room impulse response from the loudspeaker to the microphone. This may cause problems if the system from the loudspeaker to the microphone is not accurately modeled as being linear. For the microphone, linearity may be a valid assumption, but for the loudspeaker this assumption is often invalid. In reality many devices such as laptops, cell phones, low-priced speakerphones, etc. have poor loudspeakers due to limited transducer size or cost constraints. Another problem is that devices often also contain parts that may rattle and vibrate at high volume settings. Both of these problems can lead to non-linear echo components which cannot be attenuated by a conventional acoustic echo canceller. In addition, those non-linearities can also lead to a deterioration of the audio signal quality perceived by the user at the near-end. Thus, a solution is needed that can reduce the amount of non-linear echo components that remain after the acoustic echo canceller and which will be transmitted back to the far-end and that can reduce the amount of the distortion perceived at the near-end due to poor loudspeaker quality and rattling/vibrating parts in the device

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Mitigation of nonlinear echoes by dynamic range compression may be provided. An audio output may be evaluated to determine whether nonlinear echoes are interfering with an audio signal. In order to reduce such nonlinear echoes, a dynamic range compression algorithm may be applied to the audio signal prior to output. The signal may be modified according to a compression curve and/or subjected to an attenuation factor.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Dynamic range compression may be provided. Consistent with embodiments of the present invention, the generation of nonlinear echo components may be prevented. For example, devices with low-quality speakers and/or poor physical acoustics, such as may be found in a laptop, may generate rattles, vibrations, and/or other undesired acoustic artifacts. In addition, the nonlinear acoustic components of such devices may prove difficult to predict and/or estimate. Thus, a far-end digital signal may be processed by a dynamic range compression that may decrease the dynamic range of the signal by reducing the peaks of the signal while maintaining the same loudness. This may reduce the nonlinear echo as the peaks may cause saturation in the transducers or rattling of the device leading to distortion and may also improve the audio quality coming out of the loudspeaker.

Figure 1:
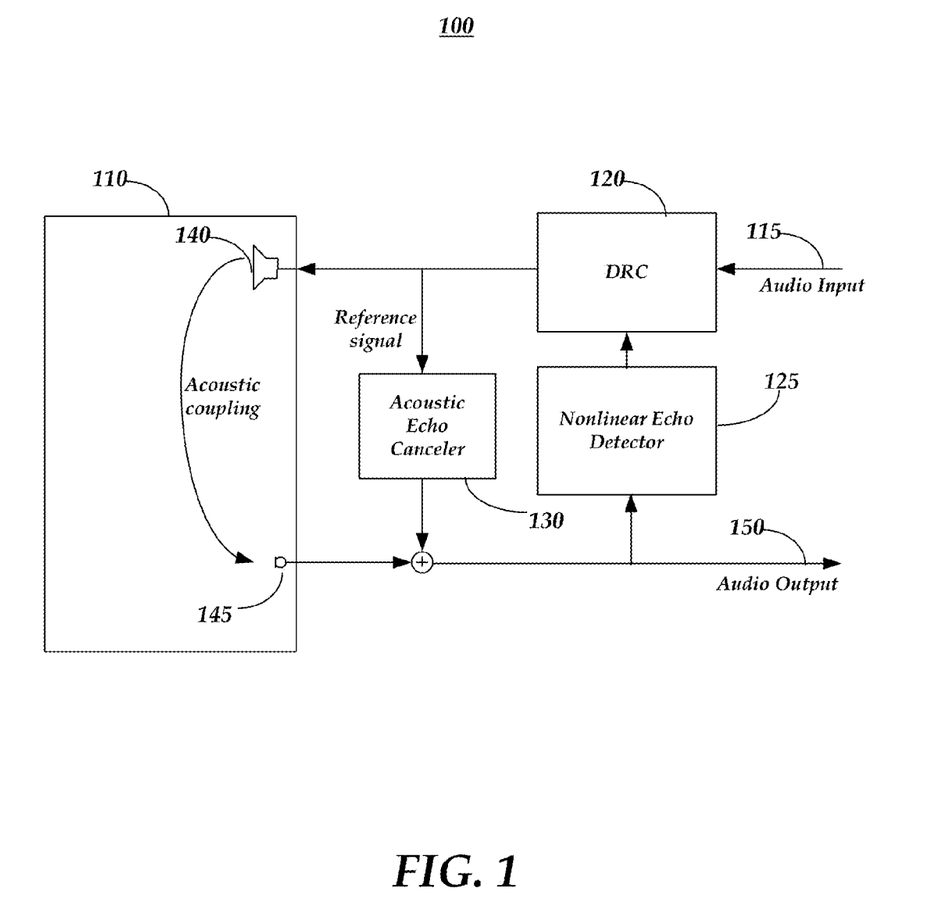
FIG. 1 is a block diagram of an operating environment.

FIG. 1 is a block diagram of an operating environment 100. Operating environment 100 may comprise a listening environment 110 operative to receive an audio input signal 115. Audio input signal 115 may pass through a dynamic range compression algorithm 120 that may be coupled to a nonlinear echo detector 125. Audio input signal 115 may be passed as a reference signal to an acoustic echo canceller 130 and provided to an audio output device 140, such as a speaker and/or headphones. Acoustic echo canceller 130 may be operative to sample audio input signal 115 as a reference signal and comparing it to the signal as received and sampled as an echo signal at audio input device 145. The reference signal, after passing through an estimated room impulse response, may be summed with the echo signal at 180° out of phase; in an ideal system this results in a perfect cancellation.

Listening environment 110 may further comprise an audio input device 145, such as a microphone, and an acoustic coupling 150 between audio output device 140 and audio input device 145. Acoustic coupling 150 may comprise a transmission path for acoustic waves between audio output device 140 and audio input device 145 in listening environment 110. Consistent with embodiments of the invention, audio input device 145 may be operative to receive audio signals output by audio output device 140 without a direct hardware connection. Computing device 500 may be operative to produce an audio output signal 160. Audio output signal 160 may be transmitted, for example, to a second computing device (not shown) from which audio input signal 115 was received. Audio output device 140 and/or audio input device 145 may be associated with a computing device 500, as described in greater detail below with respect to FIG. 5.

Consistent with embodiments of the invention, dynamic range compression aims to prevent the generation of the nonlinear echo components in case a user uses a device with a low-quality sound output device, such as laptop speakers. Audio input signal 115 may be processed by dynamic range compression (DRC) algorithm 120 before being sent to audio output device 140. DRC algorithm 120 may comprise a nonlinear compression curve that may boost low energy or low amplitude signals and maintain and/or attenuate the peaks of the signal. This may result in an increase in loudness, so the compressed range signal samples may be multiplied by an attenuation factor. Consistent with embodiments of the invention, the attenuation factor may vary according to the peak amplitude of audio input signal 115 in order to produce a target peak amplitude level. This may result in a modified audio signal that may comprise reduced dynamic range due to smaller peaks in the signal but may maintain the same loudness. Also, the nonlinear compression curve does not impact linear acoustic echo canceller 130 as the reference signal which is needed for the adaption of the filter is obtained after the processing by the dynamic range compression.

Nonlinear distortions in audio output device 140 as well as distortions and/or artifacts from rattling/vibrating parts may be caused by the high energy portions of the audio signals. Due to the reduced amount of energy in the peaks of the audio signal after the dynamic range compression, the severity of the distortions may be greatly reduced. Therefore, linear acoustic echo canceller 130 may be able to remove more echo from the signal received from audio input device 145. The audio quality which is experienced by the user of computing device 500 may be improved significantly as the amount of distortion is reduced because nonlinearities from the loudspeaker may simply not occur. Unlike conventional approaches (e.g., voice switching) that may aim to estimate and attenuate nonlinear echoes once they occur, modifying the input signal prior to playback may not impact the ability of a user of computing device 500 to participate in full-duplex audio conversations.

Figure 2:
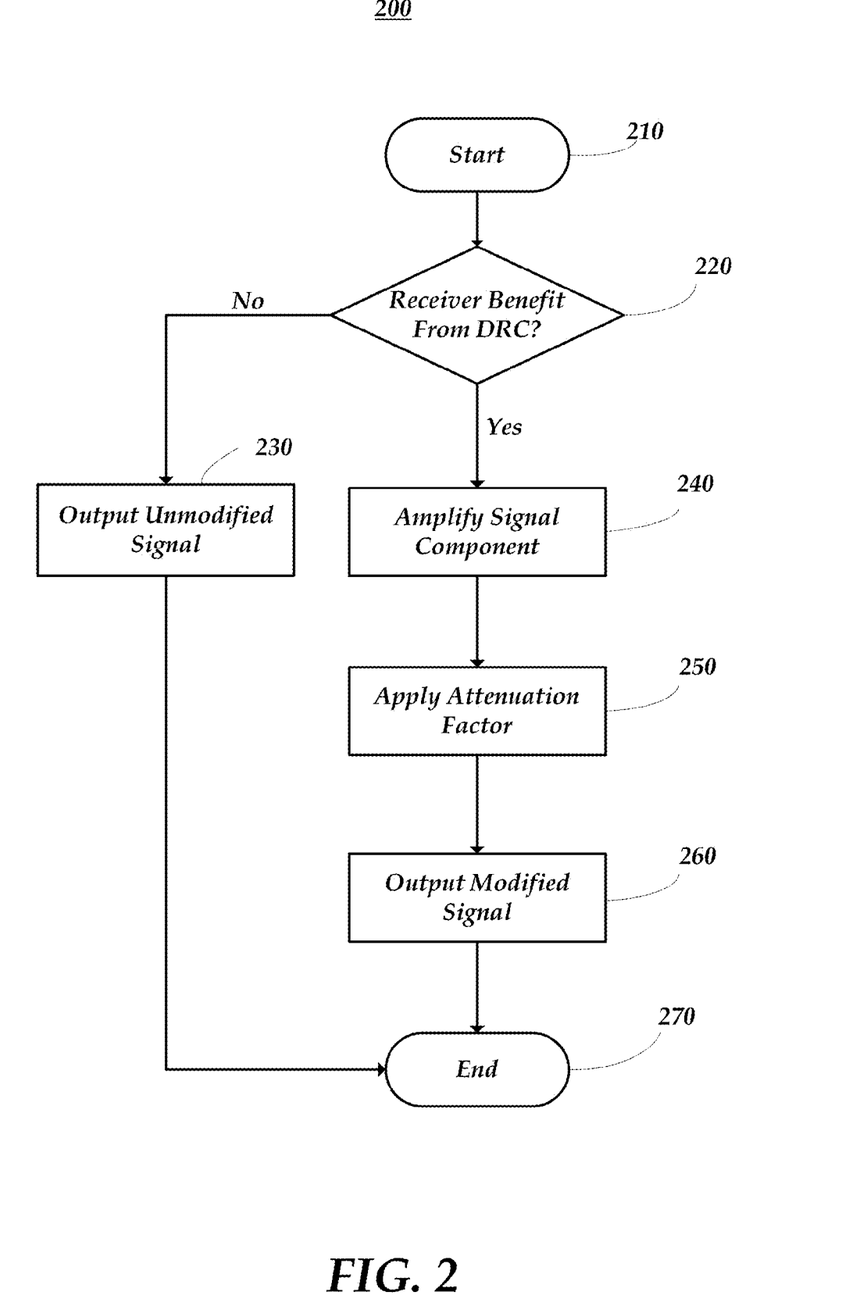
FIG. 2 is a flow chart of a method for providing dynamic range compression.

FIG. 2 is a flow chart setting forth the general stages involved in a method 200 consistent with an embodiment of the invention for providing dynamic range compression. Method 200 may be implemented using computing device 500 as described in more detail below with respect to FIG. 5. Ways to implement the stages of method 200 will be described in greater detail below. Method 200 may begin at starting block 210 and proceed to stage 220 where computing device 500 may determine whether a user of an audio signal may benefit from dynamic range compression (DRC). The user may comprise one and/or any of a plurality of recipients of an audio signal, such as a voice signal that associated with an audio communication and the determination may be made for and/or by any and/or all users associated with the audio communication. For example, each device participating in a teleconference may determine for their incoming and/or outgoing transmissions whether to apply the stages of method 200 described below.

Consistent with embodiments of the invention, determining whether to use DRC may comprise a detection of poor acoustic devices. For example, computing device 500 may determine whether the user is operating on a battery-powered device, such as a laptop, whether audio input/output devices comprise USB speakerphone devices, and/or by evaluating the output signal of the linear acoustic echo canceller and determine if there is severe echo left behind. This may indicate that there is likely high nonlinear distortion present due to poor loudspeaker acoustics.

If, at stage 220, computing device 500 determines that DRC is not needed and/or that a user would not significantly benefit from it, method 200 may advance to stage 230 where the audio signal may be relayed, transmitted, and/or output to an output device such as a speaker without modification. Otherwise, method 200 may advance to stage 240 where computing device 500 may amplify at least one component of the audio signal. For example, the audio signal may comprise a plurality of components varying in input energy from very low (e.g., −60 dB) to very high (e.g., −5 to 0 dB). Computing device 500 may amplify and/or attenuate one, some, and/or all of these components. For example, computing device 500 may apply a compression curve to the input signal operative to amplify components ranging from ~−50 dB to ~−12 dB while leaving lower amplitudes unchanged and attenuating higher amplitude components. See, for example, the compression curve illustrated by FIG. 3 and described in greater detail below.

After amplifying at least one signal component in stage 240, method 200 may advance to stage 250 where computing device 500 may apply an attenuation factor. For example, computing device 500 may apply a constant attenuation factor (e.g., 10%) to any and/or all components of the audio signal. This may result in a reduction of the peak amplitude of the signal and may thus help reduce the incidence on nonlinear components generated by the playback of higher powered signals on lower quality speakers. Consistent with embodiments of the invention, the attenuation factor may be derived based on an amount that a peak amplitude of the audio signal exceeds a threshold input power level. Further consistent with embodiments of the invention, stages 240 and 250 may be combined to use a single compression curve. For example, each of the points of the compression curve may be lowered by the attenuation factor.

From stage 250, method 200 may advance to stage 260 where computing device 500 may output the modified audio signal. For example, computing device 500 may transmit the modified audio signal to a recipient associated with the audio communication and/or playback the modified signal on audio output device 140. Method 200 may then end at stage 270.

Figure 3:
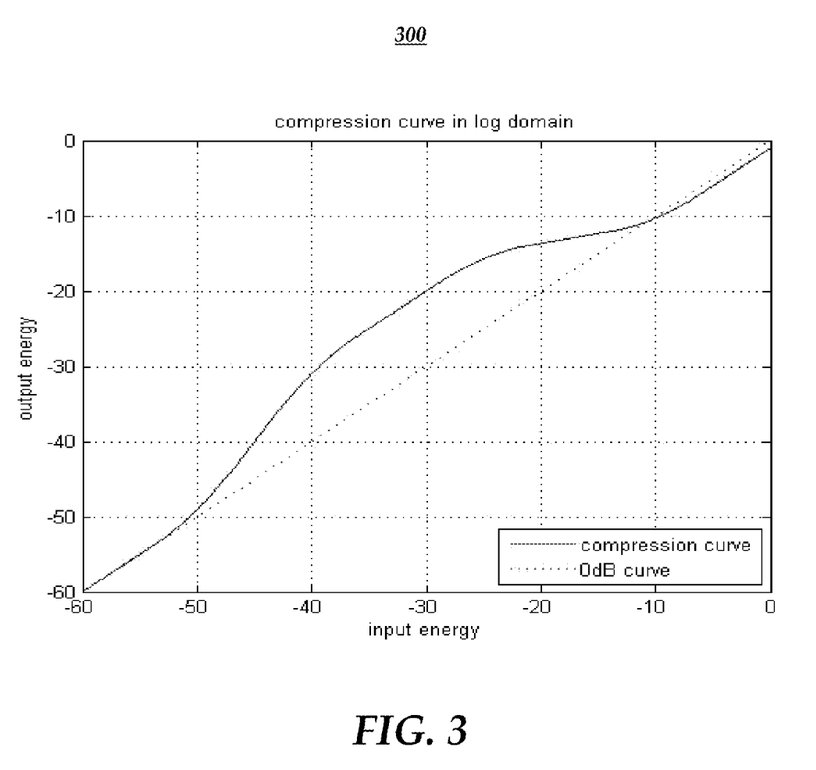
FIG. 3 is a plot of a compression curve.

FIG. 3 is a plot of a compression curve 300. Low and medium input energy components of an audio signal may be boosted by up to 10 dB while high input energy components may be left unmodified and/or attenuated. This is visible as the low and medium energy part of the curve is up to 10 dB above the 0 dB gain curve and for high energies, the curve approaches and drops below the 0 dB gain curve. Consistent with embodiments of the invention, components below an audible threshold (e.g., −60 to −53 dB) may be left unmodified. Values for compression wave 300 may be found in Table 1, below.

TABLE 1

| Input Energy (dB) | Output Energy (dB) |
| --- | --- |
| −52.9 | −52.8865 |
| −52.8 | −52.7716 |
| −52.7 | −52.6551 |
| −52.6 | −52.5373 |
| −52.5 | −52.4179 |
| −52.4 | −52.2972 |
| −52.3 | −52.175 |
| −52.2 | −52.0514 |
| −52.1 | −51.9264 |

TABLE 1-continued

| Input Energy (dB) | Output Energy (dB) |
|---|---|
| −52 | −51.8001 |
| −51.9 | −51.6723 |
| −51.8 | −51.5433 |
| −51.7 | −51.4128 |
| −51.6 | −51.2811 |
| −51.5 | −51.148 |
| −51.4 | −51.0136 |
| −51.3 | −50.878 |
| −51.2 | −50.741 |
| −51.1 | −50.6028 |
| −51 | −50.4633 |
| −50.9 | −50.3226 |
| −50.8 | −50.1806 |
| −50.7 | −50.0375 |
| −50.6 | −49.8931 |
| −50.5 | −49.7475 |
| −50.4 | −49.6008 |
| −50.3 | −49.4529 |
| −50.2 | −49.3038 |
| −50.1 | −49.1536 |
| −50 | −49.0023 |
| −49.9 | −48.8499 |
| −49.8 | −48.6963 |
| −49.7 | −48.5417 |
| −49.6 | −48.3859 |
| −49.5 | −48.2292 |
| −49.4 | −48.0713 |
| −49.3 | −47.9124 |
| −49.2 | −47.7525 |
| −49.1 | −47.5916 |
| −49 | −47.4297 |
| −48.9 | −47.2668 |
| −48.8 | −47.1029 |
| −48.7 | −46.938 |
| −48.6 | −46.7722 |
| −48.5 | −46.6055 |
| −48.4 | −46.4378 |
| −48.3 | −46.2692 |
| −48.2 | −46.0997 |
| −48.1 | −45.9293 |
| −48 | −45.758 |
| −47.9 | −45.5859 |
| −47.8 | −45.4129 |
| −47.7 | −45.2391 |
| −47.6 | −45.0645 |
| −47.5 | −44.889 |
| −47.4 | −44.7128 |
| −47.3 | −44.5357 |
| −47.2 | −44.3579 |
| −47.1 | −44.1793 |
| −47 | −44 |
| −46.9 | −43.8 |
| −46.8 | −43.6 |
| −46.7 | −43.4 |
| −46.6 | −43.2 |
| −46.5 | −43 |
| −46.4 | −42.8 |
| −46.3 | −42.6 |
| −46.2 | −42.4 |
| −46.1 | −42.2 |
| −46 | −42 |
| −45.9 | −41.8 |
| −45.8 | −41.6 |
| −45.7 | −41.4 |
| −45.6 | −41.2 |
| −45.5 | −41 |
| −45.4 | −40.8 |
| −45.3 | −40.6 |
| −45.2 | −40.4 |
| −45.1 | −40.2 |
| −45 | −40 |
| −44.9 | −39.8 |
| −44.8 | −39.6 |
| −44.7 | −39.4 |
| −44.6 | −39.2 |
| −44.5 | −39 |
| −44.4 | −38.8 |

TABLE 1-continued

| Input Energy (dB) | Output Energy (dB) |
|---|---|
| −44.3 | −38.6 |
| −44.2 | −38.4 |
| −44.1 | −38.2 |
| −44 | −38 |
| −43.9 | −37.8 |
| −43.8 | −37.6 |
| −43.7 | −37.4 |
| −43.6 | −37.2 |
| −43.5 | −37 |
| −43.4 | −36.8 |
| −43.3 | −36.6 |
| −43.2 | −36.4 |
| −43.1 | −36.2 |
| −43 | −36 |
| −42.9 | −35.8207 |
| −42.8 | −35.6421 |
| −42.7 | −35.4643 |
| −42.6 | −35.2872 |
| −42.5 | −35.111 |
| −42.4 | −34.9355 |
| −42.3 | −34.7609 |
| −42.2 | −34.5871 |
| −42.1 | −34.4141 |
| −42 | −34.242 |
| −41.9 | −34.0707 |
| −41.8 | −33.9003 |
| −41.7 | −33.7308 |
| −41.6 | −33.5622 |
| −41.5 | −33.3945 |
| −41.4 | −33.2278 |
| −41.3 | −33.062 |
| −41.2 | −32.8971 |
| −41.1 | −32.7332 |
| −41 | −32.5703 |
| −40.9 | −32.4084 |
| −40.8 | −32.2475 |
| −40.7 | −32.0876 |
| −40.6 | −31.9287 |
| −40.5 | −31.7708 |
| −40.4 | −31.6141 |
| −40.3 | −31.4583 |
| −40.2 | −31.3037 |
| −40.1 | −31.1501 |
| −40 | −30.9977 |
| −39.9 | −30.8464 |
| −39.8 | −30.6962 |
| −39.7 | −30.5471 |
| −39.6 | −30.3992 |
| −39.5 | −30.2525 |
| −39.4 | −30.1069 |
| −39.3 | −29.9625 |
| −39.2 | −29.8194 |
| −39.1 | −29.6774 |
| −39 | −29.5367 |
| −38.9 | −29.3972 |
| −38.8 | −29.259 |
| −38.7 | −29.122 |
| −38.6 | −28.9864 |
| −38.5 | −28.852 |
| −38.4 | −28.7189 |
| −38.3 | −28.5872 |
| −38.2 | −28.4567 |
| −38.1 | −28.3277 |
| −38 | −28.1999 |
| −37.9 | −28.0736 |
| −37.8 | −27.9486 |
| −37.7 | −27.825 |
| −37.6 | −27.7028 |
| −37.5 | −27.5821 |
| −37.4 | −27.4627 |
| −37.3 | −27.3449 |
| −37.2 | −27.2284 |
| −37.1 | −27.1135 |
| −37 | −27 |
| −36.9 | −26.9 |
| −36.8 | −26.8 |
| −36.7 | −26.7 |

TABLE 1-continued

| Input Energy (dB) | Output Energy (dB) |
|---|---|
| −36.6 | −26.6 |
| −36.5 | −26.5 |
| −36.4 | −26.4 |
| −36.3 | −26.3 |
| −36.2 | −26.2 |
| −36.1 | −26.1 |
| −36 | −26 |
| −35.9 | −25.9 |
| −35.8 | −25.8 |
| −35.7 | −25.7 |
| −35.6 | −25.6 |
| −35.5 | −25.5 |
| −35.4 | −25.4 |
| −35.3 | −25.3 |
| −35.2 | −25.2 |
| −35.1 | −25.1 |
| −35 | −25 |
| −34.9 | −24.9 |
| −34.8 | −24.8 |
| −34.7 | −24.7 |
| −34.6 | −24.6 |
| −34.5 | −24.5 |
| −34.4 | −24.4 |
| −34.3 | −24.3 |
| −34.2 | −24.2 |
| −34.1 | −24.1 |
| −34 | −24 |
| −33.9 | −23.9 |
| −33.8 | −23.8 |
| −33.7 | −23.7 |
| −33.6 | −23.6 |
| −33.5 | −23.5 |
| −33.4 | −23.4 |
| −33.3 | −23.3 |
| −33.2 | −23.2 |
| −33.1 | −23.1 |
| −33 | −23 |
| −32.9 | −22.9 |
| −32.8 | −22.8 |
| −32.7 | −22.7 |
| −32.6 | −22.6 |
| −32.5 | −22.5 |
| −32.4 | −22.4 |
| −32.3 | −22.3 |
| −32.2 | −22.2 |
| −32.1 | −22.1 |
| −32 | −22 |
| −31.9 | −21.9 |
| −31.8 | −21.8 |
| −31.7 | −21.7 |
| −31.6 | −21.6 |
| −31.5 | −21.5 |
| −31.4 | −21.4 |
| −31.3 | −21.3 |
| −31.2 | −21.2 |
| −31.1 | −21.1 |
| −31 | −21 |
| −30.9 | −20.9 |
| −30.8 | −20.8 |
| −30.7 | −20.7 |
| −30.6 | −20.6 |
| −30.5 | −20.5 |
| −30.4 | −20.4 |
| −30.3 | −20.3 |
| −30.2 | −20.2 |
| −30.1 | −20.1 |
| −30 | −20 |
| −29.9 | −19.9 |
| −29.8 | −19.8 |
| −29.7 | −19.7 |
| −29.6 | −19.6 |
| −29.5 | −19.5 |
| −29.4 | −19.4 |
| −29.3 | −19.3 |
| −29.2 | −19.2 |
| −29.1 | −19.1 |
| −29 | −19 |

TABLE 1-continued

| Input Energy (dB) | Output Energy (dB) |
|---|---|
| −28.9 | −18.9 |
| −28.8 | −18.8 |
| −28.7 | −18.7 |
| −28.6 | −18.6 |
| −28.5 | −18.5 |
| −28.4 | −18.4 |
| −28.3 | −18.3 |
| −28.2 | −18.2 |
| −28.1 | −18.1 |
| −28 | −18 |
| −27.9 | −17.9166 |
| −27.8 | −17.8335 |
| −27.7 | −17.7508 |
| −27.6 | −17.6685 |
| −27.5 | −17.5867 |
| −27.4 | −17.5052 |
| −27.3 | −17.4242 |
| −27.2 | −17.3437 |
| −27.1 | −17.2636 |
| −27 | −17.184 |
| −26.9 | −17.105 |
| −26.8 | −17.0264 |
| −26.7 | −16.9484 |
| −26.6 | −16.871 |
| −26.5 | −16.7942 |
| −26.4 | −16.7179 |
| −26.3 | −16.6423 |
| −26.2 | −16.5672 |
| −26.1 | −16.4928 |
| −26 | −16.4191 |
| −25.9 | −16.3461 |
| −25.8 | −16.2737 |
| −25.7 | −16.2021 |
| −25.6 | −16.1312 |
| −25.5 | −16.061 |
| −25.4 | −15.9916 |
| −25.3 | −15.9229 |
| −25.2 | −15.8551 |
| −25.1 | −15.788 |
| −25 | −15.7218 |
| −24.9 | −15.6564 |
| −24.8 | −15.5919 |
| −24.7 | −15.5282 |
| −24.6 | −15.4655 |
| −24.5 | −15.4036 |
| −24.4 | −15.3427 |
| −24.3 | −15.2827 |
| −24.2 | −15.2236 |
| −24.1 | −15.1656 |
| −24 | −15.1085 |
| −23.9 | −15.0524 |
| −23.8 | −14.9974 |
| −23.7 | −14.9434 |
| −23.6 | −14.8904 |
| −23.5 | −14.8385 |
| −23.4 | −14.7877 |
| −23.3 | −14.738 |
| −23.2 | −14.6895 |
| −23.1 | −14.642 |
| −23 | −14.5957 |
| −22.9 | −14.5506 |
| −22.8 | −14.5067 |
| −22.7 | −14.464 |
| −22.6 | −14.4225 |
| −22.5 | −14.3822 |
| −22.4 | −14.3432 |
| −22.3 | −14.3055 |
| −22.2 | −14.269 |
| −22.1 | −14.2338 |
| −22 | −14.2 |
| −21.9 | −14.1733 |
| −21.8 | −14.1467 |
| −21.7 | −14.12 |
| −21.6 | −14.0933 |
| −21.5 | −14.0667 |
| −21.4 | −14.04 |
| −21.3 | −14.0133 |

TABLE 1-continued

| Input Energy (dB) | Output Energy (dB) |
|---|---|
| −21.2 | −13.9867 |
| −21.1 | −13.96 |
| −21 | −13.9333 |
| −20.9 | −13.9067 |
| −20.8 | −13.88 |
| −20.7 | −13.8533 |
| −20.6 | −13.8267 |
| −20.5 | −13.8 |
| −20.4 | −13.7733 |
| −20.3 | −13.7467 |
| −20.2 | −13.72 |
| −20.1 | −13.6933 |
| −20 | −13.6667 |
| −19.9 | −13.64 |
| −19.8 | −13.6133 |
| −19.7 | −13.5867 |
| −19.6 | −13.56 |
| −19.5 | −13.5333 |
| −19.4 | −13.5067 |
| −19.3 | −13.48 |
| −19.2 | −13.4533 |
| −19.1 | −13.4267 |
| −19 | −13.4 |
| −18.9 | −13.3733 |
| −18.8 | −13.3467 |
| −18.7 | −13.32 |
| −18.6 | −13.2933 |
| −18.5 | −13.2667 |
| −18.4 | −13.24 |
| −18.3 | −13.2133 |
| −18.2 | −13.1867 |
| −18.1 | −13.16 |
| −18 | −13.1333 |
| −17.9 | −13.1067 |
| −17.8 | −13.08 |
| −17.7 | −13.0533 |
| −17.6 | −13.0267 |
| −17.5 | −13 |
| −17.4 | −12.9733 |
| −17.3 | −12.9467 |
| −17.2 | −12.92 |
| −17.1 | −12.8933 |
| −17 | −12.8667 |
| −16.9 | −12.84 |
| −16.8 | −12.8133 |
| −16.7 | −12.7867 |
| −16.6 | −12.76 |
| −16.5 | −12.7333 |
| −16.4 | −12.7067 |
| −16.3 | −12.68 |
| −16.2 | −12.6533 |
| −16.1 | −12.6267 |
| −16 | −12.6 |
| −15.9 | −12.5733 |
| −15.8 | −12.5467 |
| −15.7 | −12.52 |
| −15.6 | −12.4933 |
| −15.5 | −12.4667 |
| −15.4 | −12.44 |
| −15.3 | −12.4133 |
| −15.2 | −12.3867 |
| −15.1 | −12.36 |
| −15 | −12.3333 |
| −14.9 | −12.3067 |
| −14.8 | −12.28 |
| −14.7 | −12.2533 |
| −14.6 | −12.2267 |
| −14.5 | −12.2 |
| −14.4 | −12.1733 |
| −14.3 | −12.1467 |
| −14.2 | −12.12 |
| −14.1 | −12.0933 |
| −14 | −12.0667 |
| −13.9 | −12.04 |
| −13.8 | −12.0133 |
| −13.7 | −11.9867 |
| −13.6 | −11.96 |

TABLE 1-continued

| Input Energy (dB) | Output Energy (dB) |
|---|---|
| −13.5 | −11.9333 |
| −13.4 | −11.9067 |
| −13.3 | −11.88 |
| −13.2 | −11.8533 |
| −13.1 | −11.8267 |
| −13 | −11.8 |
| −12.9 | −11.7662 |
| −12.8 | −11.731 |
| −12.7 | −11.6945 |
| −12.6 | −11.6568 |
| −12.5 | −11.6178 |
| −12.4 | −11.5775 |
| −12.3 | −11.536 |
| −12.2 | −11.4933 |
| −12.1 | −11.4494 |
| −12 | −11.4043 |
| −11.9 | −11.358 |
| −11.8 | −11.3105 |
| −11.7 | −11.262 |
| −11.6 | −11.2123 |
| −11.5 | −11.1615 |
| −11.4 | −11.1096 |
| −11.3 | −11.0566 |
| −11.2 | −11.0026 |
| −11.1 | −10.9476 |
| −11 | −10.8915 |
| −10.9 | −10.8344 |
| −10.8 | −10.7764 |
| −10.7 | −10.7173 |
| −10.6 | −10.6573 |
| −10.5 | −10.5964 |
| −10.4 | −10.5345 |
| −10.3 | −10.4718 |
| −10.2 | −10.4081 |
| −10.1 | −10.3436 |
| −10 | −10.2782 |
| −9.9 | −10.212 |
| −9.8 | −10.1449 |
| −9.7 | −10.0771 |
| −9.6 | −10.0084 |
| −9.5 | −9.939 |
| −9.4 | −9.8688 |
| −9.3 | −9.7979 |
| −9.2 | −9.7263 |
| −9.1 | −9.6539 |
| −9 | −9.5809 |
| −8.9 | −9.5072 |
| −8.8 | −9.4328 |
| −8.7 | −9.3577 |
| −8.6 | −9.2821 |
| −8.5 | −9.2058 |
| −8.4 | −9.129 |
| −8.3 | −9.0516 |
| −8.2 | −8.9736 |
| −8.1 | −8.895 |
| −8 | −8.816 |
| −7.9 | −8.7364 |
| −7.8 | −8.6563 |
| −7.7 | −8.5758 |
| −7.6 | −8.4948 |
| −7.5 | −8.4133 |
| −7.4 | −8.3315 |
| −7.3 | −8.2492 |
| −7.2 | −8.1665 |
| −7.1 | −8.0834 |
| −7 | −8 |
| −6.9 | −7.9 |
| −6.8 | −7.8 |
| −6.7 | −7.7 |
| −6.6 | −7.6 |
| −6.5 | −7.5 |
| −6.4 | −7.4 |
| −6.3 | −7.3 |
| −6.2 | −7.2 |
| −6.1 | −7.1 |
| −6 | −7 |
| −5.9 | −6.9 |

TABLE 1-continued

| Input Energy (dB) | Output Energy (dB) |
|---|---|
| −5.8 | −6.8 |
| −5.7 | −6.7 |
| −5.6 | −6.6 |
| −5.5 | −6.5 |
| −5.4 | −6.4 |
| −5.3 | −6.3 |
| −5.2 | −6.2 |
| −5.1 | −6.1 |
| −5 | −6 |
| −4.9 | −5.9 |
| −4.8 | −5.8 |
| −4.7 | −5.7 |
| −4.6 | −5.6 |
| −4.5 | −5.5 |
| −4.4 | −5.4 |
| −4.3 | −5.3 |
| −4.2 | −5.2 |
| −4.1 | −5.1 |
| −4 | −5 |
| −3.9 | −4.9 |
| −3.8 | −4.8 |
| −3.7 | −4.7 |
| −3.6 | −4.6 |
| −3.5 | −4.5 |
| −3.4 | −4.4 |
| −3.3 | −4.3 |
| −3.2 | −4.2 |
| −3.1 | −4.1 |
| −3 | −4 |
| −2.9 | −3.9 |
| −2.8 | −3.8 |
| −2.7 | −3.7 |
| −2.6 | −3.6 |
| −2.5 | −3.5 |
| −2.4 | −3.4 |
| −2.3 | −3.3 |
| −2.2 | −3.2 |
| −2.1 | −3.1 |
| −2 | −3 |
| −1.9 | −2.9 |
| −1.8 | −2.8 |
| −1.7 | −2.7 |
| −1.6 | −2.6 |
| −1.5 | −2.5 |
| −1.4 | −2.4 |
| −1.3 | −2.3 |
| −1.2 | −2.2 |
| −1.1 | −2.1 |
| −1 | −2 |
| −0.9 | −1.9 |
| −0.8 | −1.8 |
| −0.7 | −1.7 |
| −0.6 | −1.6 |
| −0.5 | −1.5 |
| −0.4 | −1.4 |
| −0.3 | −1.3 |
| −0.2 | −1.2 |
| −0.1 | −1.1 |
| 0 | −1 |

Figure 4A:
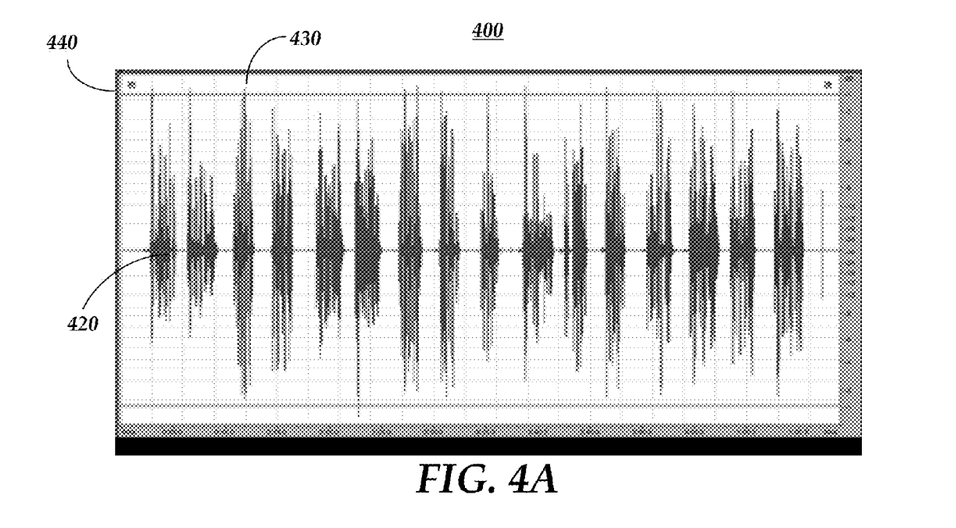
FIG. 4A-4B are plots of an audio signal.
Figure 4B:
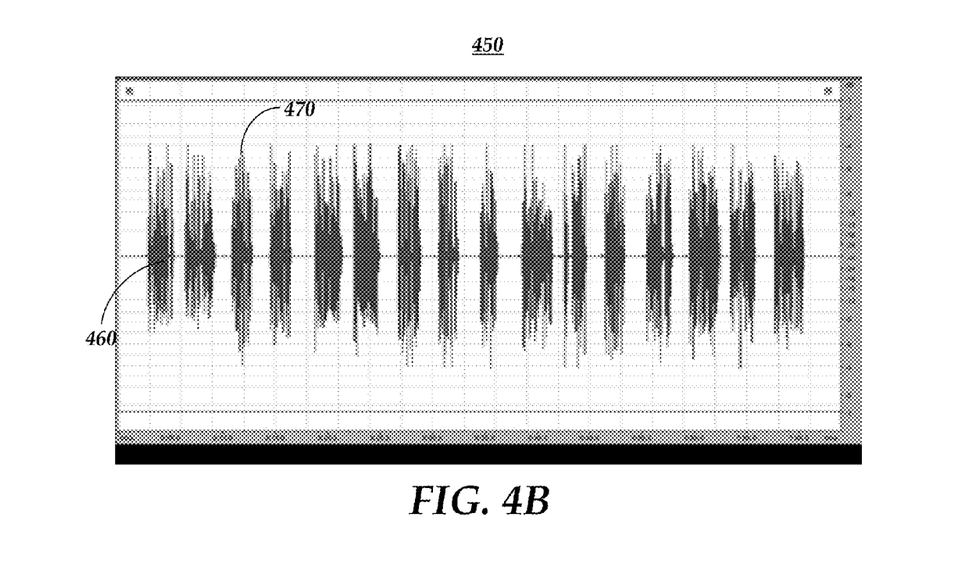

FIG. 4A is a plot of an unmodified audio signal 400. Signal 400 may comprise an original speech signal comprising a wide range of component amplitudes, such as a low amplitude component 420 and a peak amplitude component 430. Peak amplitude 430 may comprise an amplitude in excess of a threshold amplitude 440. FIG. 4B is a plot of audio signal 400 as processed by method 200 into a modified audio signal 450. Modified audio signal 450 may comprise a compressed range signal wherein amplitude peaks are lowered by an attenuation factor, as illustrated by an attenuated peak amplitude component 430. Modified audio signal 450 may further comprise a plurality of amplified lower amplitude components, such as amplified amplitude component 460. Consistent with embodiments of the invention, a root mean square of unmodified audio signal 400 is approximately the same as a root mean square of modified audio signal 450. Thus, each signal may produce approximately the same perceived loudness to a listener, but modified audio signal 450 may comprise lower output power for peak amplitudes and so minimize nonlinear echo effects.

An embodiment consistent with the invention may comprise a system for providing dynamic range compression. The system may comprise a memory storage and a processing unit coupled to the memory storage. The processing unit may be operative to determine whether a recipient of an audio signal may benefit from dynamic range compression (DRC) and, if so, modify the audio signal in accordance with a DRC algorithm. The DRC algorithm may comprise, for example, amplifying one, some, and/or all amplitude components of the audio signal and/or applying an attenuation factor to one, some, and/or all amplitude components of the audio signal. Determining whether the recipient may benefit from DRC may comprise determining whether the recipient is using a laptop computing device, detecting the presence of nonlinear echo components by measuring an output of the audio signal, and/or monitoring the output of a transmitted test frequency, such as an unmodulated tone frequency, for the presence of a nonlinear distortion.

Another embodiment consistent with the invention may comprise a system for providing dynamic range compression. The system may comprise a memory storage and a processing unit coupled to the memory storage. The processing unit may be operative to determine whether a recipient of an audio signal would benefit from application of a dynamic range compression (DRC) algorithm, modify the audio signal according to the dynamic range compression algorithm, and transmit the modified audio signal to the recipient. Consistent with embodiments of the invention, an audio communication may be associated with multiple recipients, only some of whom would benefit from the DRC algorithm. The modified signal may be sent to those who would benefit and/or all of the recipients.

Yet another embodiment consistent with the invention may comprise a system for providing dynamic range compression. The system may comprise an audio output device, a memory storage, and a processing unit coupled to the memory storage. The processing unit may be operative to determine whether an audio signal comprises a peak amplitude greater than a threshold value and apply a dynamic range compression algorithm operative to reduce the peak amplitude. The threshold level may be computed as a level sufficient to cause nonlinear echo distortions in an output of the audio signal.

Figure 5:
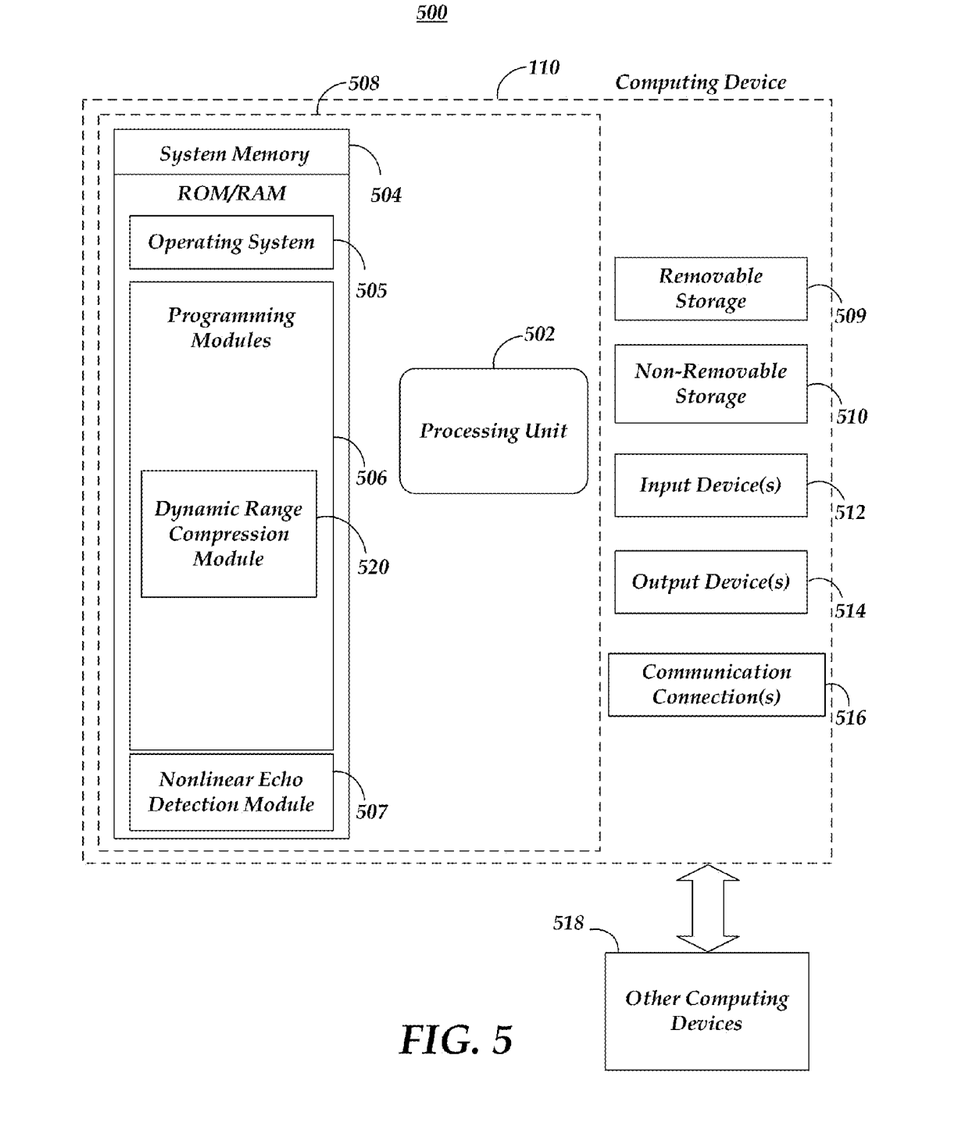
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a nonlinear echo detection module 507. Operating system 505, for example, may be suitable for controlling computing device 500's operation. In one embodiment, programming modules 506 may include a dynamic range compression module 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g., dynamic range compression module 520) may perform processes including, for example, one or more of method 200's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing dynamic range compression (DRC), the method comprising:
   processing an audio signal through an acoustic echo canceller;
   determining whether to apply DRC to the audio signal based at least in part on an amount of echo detected in the audio signal;
   if the amount of echo detected in the audio signal exceeds a threshold level, modifying the signal by applying DRC, wherein modifying the signal by applying DRC comprises:
      applying a constant attenuation factor to the audio signal to reduce at least one peak amplitude component of the audio signal,
      amplifying at least one lower amplitude component of the audio signal, and
      rerouting the modified audio signal through the acoustic echo canceller to determine whether further compression of the modified audio signal is necessary.

2. The method of claim 1,
   wherein determining whether to apply DRC to the audio signal comprises
      determining whether any of a plurality of receivers of the audio signal would benefit from the modifying of the audio signal; and
   in response to determining that none of the plurality of receivers of the audio signal would benefit from the modifying of the audio signal:
      bypassing the modification of the audio signal, and
      transmitting the unmodified audio signal to each of the plurality of receivers.

3. The method of claim 2, wherein determining whether any of the plurality of receivers of the audio signal would benefit from the modification of the audio signal comprises determining whether any of the plurality of receivers of the audio signal comprise a laptop user.

4. The method of claim 2, wherein determining whether any of the plurality of receivers of the audio signal would benefit from the modification of the audio signal comprises measuring an output of the audio signal by at least one of the plurality of receivers for a nonlinear distortion.

5. The method of claim 4, wherein measuring the output of the audio signal by at least one of the plurality of receivers for the nonlinear distortion comprises:
   transmitting an unmodulated tone frequency to at least one of the plurality of receivers;
   outputting the unmodulated tone frequency by the at least one of the plurality of receivers; and
   measuring the output of the unmodulated tone frequency by the at least one of the plurality of receivers for the nonlinear distortion.

6. The method of claim 2, wherein determining whether any of the plurality of receivers of the audio signal would benefit from the modification of the audio signal comprises determining whether at least one of the plurality of receivers detects a non-linear echo according to an acoustic echo canceller associated with the at least one of the plurality of receivers.

7. The method of claim 1, wherein amplifying at least one lower amplitude component of the audio signal comprises amplifying at least one component of the audio signal by applying a compression curve to the audio signal.

8. The method of claim 1, wherein determine whether further compression of the modified audio signal is necessary comprises determining whether there is echo remaining in the modified audio signal.

9. A computer-readable storage medium which stores a set of instructions which when executed performs a method for providing dynamic range compression, the method executed by the set of instructions comprising:
   determining whether at least one of a plurality of recipients of an audio signal would benefit from application of a dynamic range compression algorithm, wherein determining whether at least one of the plurality of recipients of the audio signal would benefit from application of the dynamic range compression algorithm comprises determining whether the at least one recipient comprises at least one of the following: a laptop, a universal serial bus (USB) speakerphone device, and echo in the audio signal; and
   in response to determining that at least one of the plurality of recipients of an audio signal would benefit from application of the dynamic range compression algorithm:
      modifying the audio signal according to the dynamic range compression algorithm, wherein modifying the audio signal comprises:

applying a constant attenuation factor to at least one first component of the audio signal to reduce a peak amplitude of the at least one first component of the audio signal, amplifying at least one lower amplitude component of the audio signal, rerouting the modified audio signal through an acoustic echo canceller to determine whether there is echo left in the modified audio signal; and transmitting the modified audio signal to the at least one of the plurality of recipients.

10. The computer-readable storage medium of claim 9, further comprising transmitting the modified audio signal to each of the plurality of recipients determined to benefit from application of the dynamic range compression algorithm.

11. The computer-readable storage medium of claim 9, further comprising transmitting the unmodified audio signal to at least one second recipient of the plurality of recipients in response to determining that the at least one second recipient of the plurality of recipients would not benefit from application of the dynamic range compression algorithm.

12. The computer-readable storage medium of claim 9, wherein the at least one first component of the audio signal is amplified according to a factor calculated from a peak amplitude of the audio signal.

13. A system for providing dynamic range compression (DRC), the system comprising:

an audio output device;

a memory storage; and a processing unit coupled to the memory storage, wherein the processing unit is operative to:

process an audio signal through an acoustic echo canceller;

determine whether to apply DRC to the audio signal based at least in part on an amount of echo detected in the audio signal;

if the amount of echo detected in the audio signal exceeds a threshold level, modify the signal by applying DRC, wherein modifying the signal by applying DRC comprises:

apply a constant attenuation factor to the audio signal to reduce at least one peak amplitude component of the audio signal, amplify at least one lower amplitude component of the audio signal, and reroute the modified audio signal through the acoustic echo canceller to determine whether further compression of the modified audio signal is necessary.

14. The system of claim 13, wherein determining whether to apply DRC to the audio signal comprises determining whether any of a plurality of receivers of the audio signal would benefit from the modifying of the audio signal; and in response to determining that none of the plurality of receivers of the audio signal would benefit from the modifying of the audio signal:

bypassing the modification of the audio signal, and transmitting the unmodified audio signal to each of the plurality of receivers.

15. The system of claim 14, wherein determining whether any of the plurality of receivers of the audio signal would benefit from the modification of the audio signal comprises determining whether any of the plurality of receivers of the audio signal comprise a laptop user.

16. The system of claim 14, wherein determining whether any of the plurality of receivers of the audio signal would benefit from the modification of the audio signal comprises measuring an output of the audio signal by at least one of the plurality of receivers for a nonlinear distortion.

17. The system of claim 16, wherein measuring the output of the audio signal by at least one of the plurality of receivers for the nonlinear distortion comprises:

transmitting an unmodulated tone frequency to at least one of the plurality of receivers;

outputting the unmodulated tone frequency by the at least one of the plurality of receivers; and measuring the output of the unmodulated tone frequency by the at least one of the plurality of receivers for the nonlinear distortion.

18. The system of claim 14, wherein determining whether any of the plurality of receivers of the audio signal would benefit from the modification of the audio signal comprises determining whether at least one of the plurality of receivers detects a non-linear echo according to an acoustic echo canceller associated with the at least one of the plurality of receivers.

19. The system of claim 13, wherein amplifying at least one lower amplitude component of the audio signal comprises amplifying at least one component of the audio signal by applying a compression curve to the audio signal.

20. The system of claim 13, wherein determine whether further compression of the modified audio signal is necessary comprises determining whether there is echo remaining in the modified audio signal.

\* \* \* \* \*